July 7, 1970    R. A. MESSING ETAL    3,519,538
CHEMICALLY COUPLED ENZYMES
Filed Sept. 5, 1968    3 Sheets-Sheet 1

INVENTORS.
Ralph A. Messing
Howard H. Weetall
BY
Gerhard K. Adam
ATTORNEY

United States Patent Office 3,519,538
Patented July 7, 1970

3,519,538
CHEMICALLY COUPLED ENZYMES
Ralph A. Messing, Horseheads, and Howard H. Weetall, Elmira, N.Y., assignors to Corning Glass Works, Corning, N.Y., a corporation of New York
Filed Sept. 5, 1968, Ser. No. 757,696
Int. Cl. C07g 7/02
U.S. Cl. 195—63     35 Claims

ABSTRACT OF THE DISCLOSURE

This invention relates to the stabilization of enzymes by chemically coupling the enzymes to an inorganic carrier by means of an intermediate silane coupling agent whereby the enzymes become insolubilized and can be used and reused over an extended period of time.

---

Figure 1:
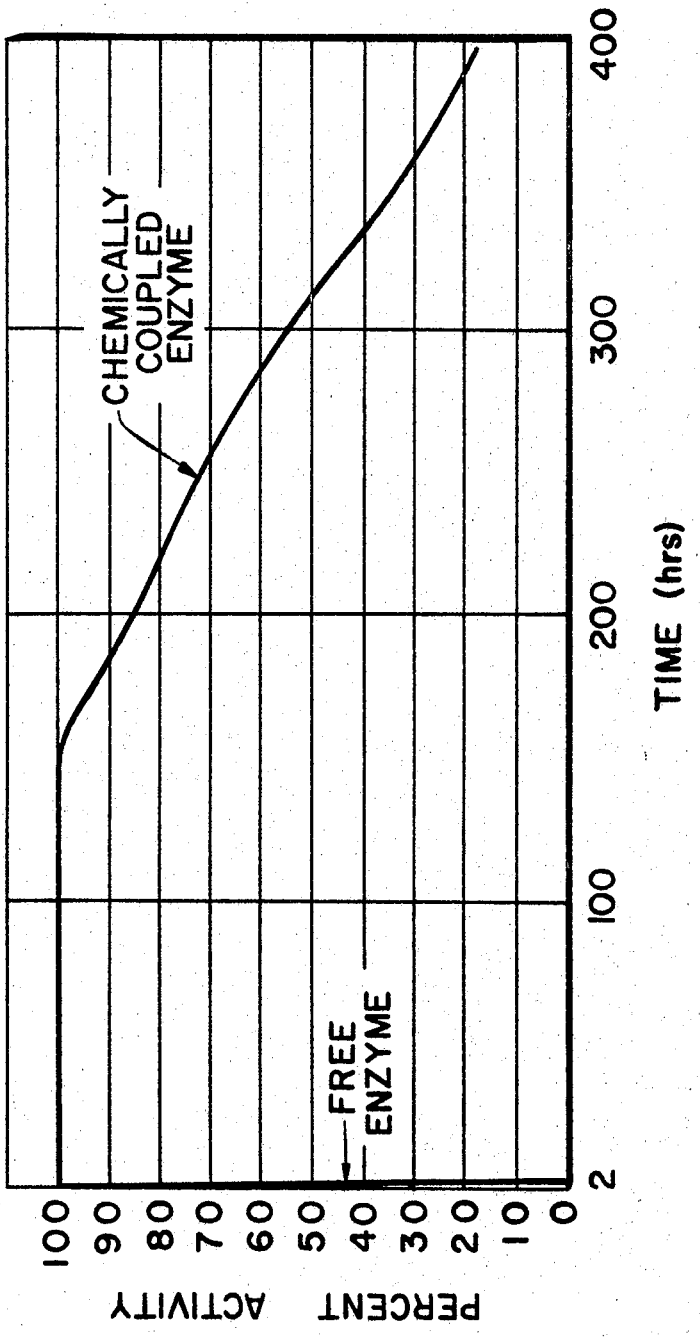

An enzyme is generally considered a biological catalyst capable of initiating, promoting, and governing a chemical reaction without being used up in the process or becoming part of the product formed. It is a substance synthesized by plants, animals, some viruses and microorganisms. All enzymes isolated thus far have been found to be proteins, i.e. peptide polymers of amino acids. An enzyme may contain prosthetic groups such as flavin adenine dinucleotide, porphyrin, diphosphopyridine nucleotide, etc. Most enzymes are macromolecules, generally, having a molecular weight greater than 6,000.

The specificity of enzymes and their ability to catalyze reactions of substrates at low concentrations have been of particular interest in chemical analyses. Enzyme catalyzed reactions have been used for some time for the qualitative and quantitative determination of substrates, activators, inhibitors, and also enzymes themselves. Until recently, the disadvantages arising from the use of enzymes have seriously limited their usefulness. Objections to the use of enzymes has been their instability, since they are susceptible to all the conditions which normally denature proteins, e.g. high temperature, concentration dependence, pH changes, microbial attack, and autohydrolysis. Furthermore, the cost of large amounts of enzymes has made their use in routine chemical analyses impractical.

Attempts have been made to prepare enzymes in an immobilized form without loss of activity so that one sample could be used continuously for many hours. The immobilized enzymes perform with increased accuracy all the operations as those of ordinary soluble enzymes; that is, they can be used to determine the concentration of a substrate, of an enzyme inhibitor, or of an enzyme activator. These have been made by physically entrapping enzymes in starch gel, polyacrylamide gel, agar, etc. Enzymes have been insolubilized by diazotizing them to cellulose derivatives and to polyaminostyrene beads. Enzymes have also been insolubilized on polytyrosyl polypeptides and collodion matrices. The main disadvantages of using such organic materials are (a) that they are subject to microbial attack resulting from the presence of carbon atoms in the polymer chain whereby the carrier is broken down and the enzymes solubilized; (b) substrate diffusion in many cases becomes the limiting factor in reaction velocity thereby decreasing apparent enzyme activity; and (c) when employed in chromatographic columns, the pH and solvent conditions increase or decrease swelling affecting flow rates of the substrate through the column.

The copending application of R. A. Messing, Ser. No. 702,829, filed Feb. 5, 1968, describes a method of making stabilized enzymes by contacting an aqueous solution of an enzyme having available amine groups with an inorganic carrier, having a high surface area and reactive silanol groups, at up to room temperature or below and for a sufficient period of time for substantial bonding of the enzyme. By that process the enzyme is assumed to be coupled directly to the carrier by means of both hydrogen bonding and amine-silicate bonding. However, a limitation of the process is that it is not general for all enzymes, since a loss of activity results when there is bonding at the active sites on the enzyme molecule.

As used herein with reference to enzymes the terms stabilized, insolubilized, and immobilized have the following meaning. The term "stabilized" means a decrease in loss of enzyme activity as a function of time and/or temperature. "Insolubilized" refers to substantially water insoluble and results from the coupling of the enzyme by covalent bonds to the insoluble inorganic carrier. Finally, "immobilization" is used to mean entrapment of the enzyme in a polymeric lattice or a semipermeable membrane.

Quite surprisingly, we have discovered a method of stabilizing enzymes by chemically coupling the enzymes to inorganic carriers which are substantially immune to attack by microbial organisms. The enzyme is chemically coupled to the carrier by a silane coupling agent which by proper selection substantially reduces or eliminates entirely loss of activity due to interference with the active sites of the enzyme molecule. Highly stable enzymes are prepared by this technique which can be used and reused over extended periods of time. It is thus even possible to calibrate the activity of an enzyme and have some certainty that upon reuse, its activity level will be substantially constant. These stabilized enzymes find considerable use in analytic procedures and may also be used in the preparation of chemicals, pharmaceuticals, and foodstuffs.

In accordance with the present invention, we have discovered an insolubilized enzyme composite comprising an enzyme coupled covalently to an inorganic carrier having available hydroxyl or oxide groups, the enzyme being coupled to the carrier by means of an intermediate silane coupling agent wherein the silicon portion of the molecule is attached to the carrier and the organic portion of the molecule is attached to the enzyme. We have also discovered a method of coupling the enzyme to the inorganic carrier through the intermediate silane controlling agent.

Enzymes capable of being stabilized as described herein include a wide variety of enzymes which may be classified under three general headings: hydrolytic enzymes, redox enzymes, and transferase enzymes. The first group, hydrolytic enzymes, include proteolytic enzymes which hydrolyze proteins, e.g. papain, ficin, pepsin, trypsin, chymotrypsin, bromelin, keratinase; carbohydrases which hydrolyze carbohydrates, e.g. cellulase, amylase, maltase, pectinase, chitinase; esterases which hydrolyze esters, e.g. lipase, cholinesterase, lecithinase, alkaline and acid phosphatases; nucleases which hydrolyze nucleic acid, e.g. ribonuclease, desoxyribonuclease; and amidases which hydrolyze amines, e.g. arginase, aspariginase, glutaminase, and urease. The second group are redox enzymes that catalyze oxidation or reduction reactions. These include glucose oxidase, catalase, peroxidase, lipoxidase, and cytochrome reductase. In the third group are transferase enzymes that transfer groups from one molecule to another. Examples of these are glutamicpyruvic transaminase, glutamic-oxalacetic transaminase, transmethylase, phosphopyruvic transphosphorylase.

The carriers are inorganic materials having available oxide or hydroxide groups. These materials must be substantially water insoluble and are either weak acids or weak bases. They may also be classified in terms of chemical composition as siliceous materials or non-siliceous metal oxides. Of the siliceous materials, a preferred carrier is porous glass either in particulate form or as an integral piece such as a disc. Glass has the advantage in that it is dimensionally stable and that it can be thoroughly cleaned to remove contaminants as for example by sterilization. Porous glass useful as a carrier is readily available and sold commercially by Corning Glass Works as Code 7930 porous glass. Such porous glass can be prepared having various pore dimensions in accordance with the teachings of Hood et al., U.S. Pat. No. 2,106,764, Chapman et al., U.S. patent application Ser. No. 565,372, now Pat. No. 3,485,687, and W. Haller, U.S. patent application Ser. No. 507,092. Other siliceous inorganic carriers which can also be used include colloidal silica (commercially available under the trademark Cab-O-Sil), wollastonite (a natural occurring calcium silicate), dried silica gel, and bentonite. Representative non-siliceous metal oxides include alumina, hydroxy apatite, and nickel oxide. These representative inorganic carriers may be classified as shown in the table below:

INORGANIC CARRIERS

| Siliceous | | Non-siliceous metal oxides | | |
|---|---|---|---|---|
| Amorphous | Crystalline | Transition MeO | Acid MeO | Base MeO |
| Glass | Bentonite | NiO | Al$_2$O$_3$ | Hydroxy. Apatite. |
| Silica Gel | Wollastonite | | | |
| Colloidal Silica | | | | |

The silane coupling agents are molecules which possess two different kinds of reactivity. These are organofunctional and silicon-functional silicon compounds characterized in that the silicon portion of the molecule has an affinity for inorganic materials such as glass and aluminum silicate, while the organic portion of the molecule is tailored to combine with many organics. The main function of the coupling agent is to provide a bond between the enzyme (organic) and the carrier (inorganic). In theory, the variety of possible organofunctional silanes useful in this invention is limited only by the number of known organo-functional groups and the available sites on the enzyme molecule for bonding. A multitude of different silane coupling agents can be used as illustrated by the general formula:

$$(Y'R')_nSiR_{4-n}$$

where Y' is a member selected from the group consisting of amino, carbonyl, carboxy, isocyano, diazo, isothiocyano, nitroso, sulfhydryl, halocarbonyl; R is a member selected from the group consisting of lower alkoxy, phenoxy, and halo; R' is a member selected from the group consisting of lower alkyl, lower alkyl-phenyl, and phenyl; and $n$ is an integer having a value of 1–3. As a further embodiment, useful silane coupling agents may be represented by the formula:

$$Y_nSiR_{4-n}$$

wherein Y is a member selected from the group consisting of amino, carbonyl, carboxyl, hydroxyphenyl, and sulfhydryl; R is a member selected from the group consisting of lower alkoxy, phenoxy, and halo; and $n$ is an integer having a value of 1–3. However, most available coupling agents have the formula:

$$RCH_2CH_2CH_2—Si(OCH_3)_3$$

wherein R is a reactive organic group, tailored to match the reactivity of the system in which it is to be used. It is not necessary to itemize the possible reactions of all these products, since the reactions of the organofunctional group can be found in any good organic chemistry book.

However, important types of bonding between the coupling agent and the enzyme with which we are concerned, illustrated merely by their functional or reactive groups, may be set forth as follows:

TYPES OF BONDING

| Bond Type | Bond structure | Reactive groups — Enzyme | Reactive groups — Coupling agent |
|---|---|---|---|
| (1) Amide | —C(=O)—NH— | —COOH, —NH$_2$ | —NH$_2$, —COOH |
| (2) Sulfonamides | —N—C(=S)—NH— | —NH$_2$ | —NH$_2$ + ClC(=S)Cl |
| (3) Azo linkage | —N=N—C$_6$H$_4$—OH | Tyrosine, Histidine, Lysine | —N$_2^+$Cl$^-$ |
| (4) Ether | R—O—R | —C—ONa | —R—X |
| (5) Ester | —C(=O)—O—R | —COOH | —R—OH |
| (6) Disulfide | R—S—S—R | R—SH | R—SH |

In one embodiment of the invention, the coupling agents are amino-functional aliphatic silanes such as N-beta-aminoethyl-gamma-aminopropyl trimethoxysilane, N-beta-aminoethyl-(alpha-methyl-gamma-aminopropyl)-dimethoxymethylsilane, and gamma-aminopropyltriethoxysilane. The coupling agent is applied to the glass substrate from a solvent solution. Only the higher boiling aromatic and aliphatic solvents have been shown to be useful. Particularly good solvents are toluene, benzene, xylene, and high boiling hydrocarbons. While the silane coupling agents are soluble in alcohol and water, these should be avoided because they interfere with good bonding. Also, aldehydes, ketones, acids, esters, or alkyl chlorides should be avoided as solvents because they tend to react with the silanes.

In order to select the optimum coupling agent or agents, it is important to consider the active sites on the enzyme molecule. Thus, as we have pointed out hereinabove, it is undesirable to bond an enzyme having an amine group in its active site by means of an amine-silicate bond. Consequently, a coupling agent should be selected which is nondestructive to the enzyme, as for example in trypsin, by bonding to the carboxyl or sulfhydryl group of the enzyme. Furthermore, the coupling agent must be such that bonding can be produced under conditions (e.g. temperature and pH) that they do not destroy either the enzyme or the carrier. The conditions under which the bonded enzyme is to be used is also significant in that the type of bond formed between the coupling agent and the enzyme, which to a large extent depends on the selection of coupling agent, should be stable at those conditions.

The bonding of the enzyme to the carrier is principally a two step reaction. Briefly, the first step involves bonding the coupling agent to the carrier and the second step involves bonding the enzyme to the coupling agent-carrier combination. The quantity of enzyme coupled appears to be dependent upon the surface area of the carrier available for reaction. Enzyme activity is dependent upon mildness of coupling conditions, but not necessarily the structure of the active site.

When we consider our novel process in more detail, there is an initial cleaning procedure to remove contaminating materials, such as organic substances, from the surface of the carrier to leave the oxide or hydroxide groups available for bonding. The cleaning technique will to some extent depend upon the particular carrier being used. When porous glass is used, it may be cleaned with a dilute nitric acid solution, rinsed with distilled water, dried, and then heated at elevated temperatures at about 625° C. in an oxygen atmosphere.

In applying the silane coupling agent from a solvent solution, it is necessary to provide some means to react the silicon-functional portion of the molecule. This may be accomplished by heating the solution to temperatures of between about 60–140° C. In a preferred method of the present invention, the silane coupling agent is dissolved in toluene in concentrations of about 0.1–10.0% by weight. Then, the solution of the coupling agent is applied by treating the carrier with the solution at elevated temperatures preferably under fluxing conditions, e.g. the toluene solution boils at about 105° C. Rfluxing may be from about 1–16 hours with four hours usualy being quite effective.

The coupling agents have been broadly defined by the formulae above. In order to form some of the compounds, the organo-functional portion of the silane may be modified after the coupling agent has been attached to the carrier. While a number of silane coupling agents are commercially available, others can be formed by standard, well-known reactions. Thus, for example the diazo derivative can be prepared from γ-aminopropyltriethoxysilane, after bonding to the carrier, by reacting with p-nitrobenzoic acid, reducing the nitro group to the amine, and then diazotizing with nitrous acid. Again starting with the γ-aminopropyltriethoxysilane bonded to the carrier, the isothiocyanoalkylsilane derivative is prepared by reacting the amino-functional group with thiophosgene.

It is now that the enzyme is reacted with the organo-functional portion of the silane coupling agent. Initially, the enzyme powder is dissolved in a buffer solution and assayed. The aqueous enzyme solution is then placed in contact with the treated carrier at a temperature of usually below room temperature and particularly in the case of proteases preferably about 5° C., since enzymes are generally more stable the lower the temperature. But in some cases, e.g. glucose oxidase, coupling occurs more rapidly at higher temperatures and coupling at room temperature for 1–2 hours is preferred.

After remaining in contact with the treated carrier for about 1–72 hours, the enzyme is bound to the carrier and any excess is removed. It is important that the pH of the solution be held within a range that the enzyme does not become irreversibly denatured. Also, the coupling reaction between the silane and the enzyme may require a certain pH range, e.g., azo linkage forms best between pH 8–9. In the case of proteases, it is preferable to couple in a pH range of lower enzymatic activity. Thereafter, the bonded enzyme is assayed. Finally, the bonded enzyme may be air dried, but not desiccated, and stored. Alternatively, the bound enzyme may be stored in water or a buffered solution at room temperature or below.

The product obtained by our novel method is an insolubilized enzyme which has been stabilized to give a constant level of activity over a long period of time. When stored at temperatures of about 5° C. or even at room temperature over a period of months, the bonded enzyme exhibits a constant level of activity with repeated exposure to assay conditions.

Our invention is further illustrated by the following examples.

EXAMPLE I

A sample of powered porous 96% silica glass (950 A.±50 A. pore size, 16m.²/gm. surface area) was washed in 0.2 N $HNO_3$ at 80° C. with continuous sonication for at least 3 hours. The glass was washed several times with distilled water by decantation and then heated to 625° C. overnight in the presence of $O_2$.

The glass was cooled and placed into a round bottomed flask. To each 2 g. of glass were added 100 ml. of a 10% solution of γ-aminopropyltriethyoxysilane in toluene. The mixture was refluxed overnight and washed with acetone. The final product was air dried and stored. The resultant derivative (hereinafter referred to as aminoalkylsilane derivative) was found to contain 0.171 meq. of silane residues/g. of glass as determined by total nitrogen.

One gram of treated glass was added to 3.5 ml. of distilled water containing 100 mg. of crystalline trypsin. This was then added to a mixture of 0.5 ml. N, N'-dicyclohexylcarbodiimide (DCCI) in 0.5 ml. tetrahydrofuran (THF). The recatants were stirred overnight at room temperature. The product was washed exhaustively with $NaHCO_3$ solution, 0.001 M HCl, and distilled water. The insolubilized trypsin was stored in 0.001 M HCl at 5° C.

The hydrolysis of benzoyl-arginine ethyl ester (BAEE) was carried out at pH 8.1 in 0.1 M glycine. One unit of activity is equal to the hydrolysis of 1 μmole of substrate/minute at 250 C. at pH 8.1.

Several samples prepared as described above were assayed. The procedure was as follows: One gram of glass-enzyme was added to 50 ml. of substrate containing 0.08 mg. BAEE/ml. of buffer. The reactants were stirred on a magnetic stirrer and sampled every three minutes. The samples were filtered and assayed spectrophotometrically at 247 mμ. The average change in optical density/minute was determined and the activity calculated.

Three representative samples assayed by the above method were found to contain 8.5 units, 25.2 units, and 12.0 units per gram of glass. This represents only microgram quantities of active enzyme. The total enzyme coupled by this method was 0.347 mg./g. glass as determined by total nitrogen.

EXAMPLE II

To 2 g. of aminoalkylsilane derivative of porous glass (780 A.±50 A. pore size), as prepared in Example I, was added 1 g. of p-nitrobenzoic acid. This was stirred for two days at room temperature in a 10% solution of DCCI in absolute methanol. The reacted material was washed exhaustively in methanol, added to 500 ml. of distilled water containing 5.0 g. sodium dithionite and boiled for 30 minutes. The p-aminobenzoic acid amide of the aminoalylsilane-glass (hereinafter referred to as aminoarylsilane derivative) was washed with distilled water, followed by acetone and air dried.

The aminoarylsilane derivative was diazotized in 0.1 N HCl by addition of an excess of solid $NaNO_2$ at 0° C. One gram of product (hereinafter referred to as diazoarylsilane derivative) was added to 14 mg. of crystalline trypsin in 50 ml. $NaHCO_3$ solution. The reaction was continued at 5° C. overnight. Thereafter, the chemically coupled trypsin was washed in $NaHCO_3$ solution and distilled water.

The assay was carried out essentially as described previously in Example I except that the substrate contained 0.08 mg. BAEE/ml. dissolved in 0.07 M phosphate buffer adjusted to pH 7.0. The chemically coupled trypsin was found to contain the equivalent of 0.189 mg. of active enzyme/g. of glass. Nitrogen determination revealed 5.67 mg. enzyme were coupled per g. glass. The enzyme activity retained was 3.2% of the total trypsin coupled.

A column was prepared and filled with 1.0 g. of the chemically coupled trypsin composite. The packed column was 1.0 cm. in diameter x 5.0 cm. long. The substrate, 0.08 mg./ml. of BAEE dissolved in 0.07 M phosphate buffer, pH 7.0, was passed through the column at the rate of 0.5 ml./minute, giving 90% conversion of substrate to product. The column was operated at 23° C. ±1° C. continuously. The product was continuously monitored at 253 m$\mu$ spectrophotometrically in a 1.0 cm. flow-through cell.

To show the stability with respect to time of the chemically coupled trypsin as compared to the free (uncoupled) trypsin, a comparative experiment was run at 23° C. Crystalline trypsin at a concentration of 0.5 mg./ml. was placed in 0.07 M phosphate buffer solution. At intervals 0.05 ml. samples were withdrawn, added to 3.0 ml. of the substrate, and assayed for activity.

FIG. 1 graphically indicates the results obtained at room temperature in terms of percent activity as a function of time for the Free Enzyme and the Chemically Coupled Enzyme. For the free enzyme, the activities were plotted as percent of original activity of the dissolved enzyme. Within less than two hours, all enzyme activity was destroyed by autohydrolysis of the free trypsin. The original conversion rate of the chemically coupled enzyme was arbitrarily set at 100% activity. No loss in activity was observed for 154 hours of continuous assay. Thereafter the enzyme began to lose activity, but even after 397 hours considerable activity was still observed.

EXAMPLE III

Ten grams of the aminoalkylsilane derivative as prepared in Example I was added to 100 ml. of 10% thiophosgene in chloroform and refluxed for several hours. The product was washed exhaustively in chloroform to remove the remaining thiophosgene. The isothiocyanoalkylsilane derivative was air dried and used immediately after synthesis for coupling to trypsin.

Two grams of the isothiocyanoalkylsilane derivative were added to 50 ml. of NaHCO$_3$ solution, pH 9.0, containing 100 mg. of trypsin. The reactants were stirred for two hours at room temperature and then exhaustively washed in distilled water. The product was stored in distilled water at 5° C. until use. The chemically coupled trypsin was found to contain 2.1 mg. protein as determined by total nitrogen.

The substrate was heat-denatured casein at a concentration of 5.0 g./liter in 0.1 M phosphate buffer, pH 7.0. A one-gram sample of the coupled enzyme was added to 50 ml. of substrate. The mixture was stirred constantly. Samples were taken every 60 seconds and added to an equal volume of 10% trichloroacetic acid. The precipitate was filtered after 15 minutes and the filtrate was read spectrophotometrically against a substrate blank treated in the same manner. The enzyme-glass product prepared was found to contain 0.120 mg. active enzyme/g. glass.

EXAMPLE IV

The diazoarylsilane derivative of glass was prepared as previously described in Example II. The enzyme was coupled through azo-linkage in a 1% solution of crude papain. The coupled glass-enzyme was added to 100 ml. of 1.0% casein containing 61.5 mg. cysteine and 32 mg. disodium ethylenediaminetetraacetate (Na$_2$H$_2$EDTA) in 0.1 M phosphate buffer, pH 6.9. During the assay 4 ml. aliquots were taken, added to 4 ml. trichloroacetic acid (TCA), centrifuged and then read at 280 m$\mu$. The optical densities were compared with a TCA precipitated sample of the substrate bfeore contact with enzyme. The chemically coupled papain was found to contain 2.55 mg. active enzyme per g. glass.

In order to demonstrate the thermal stability of bound papain, the following experiment was performed. One gram of the chemically coupled papain composite was poured into a column and aliquots of the column eluate continuously assayed. The substrate for the experiment was 3% casein in 0.1 M phosphate buffer, pH 6.9. The column temperature was maintained at 88° C. throughout the experiment. The flow rate was adjusted to 2.8 ml./minute. The substrate was continuously passed through the column and aliquots collected for assay by TCA precipitation. The degree of hydrolysis obtained initially was arbitrarily set as 100% enzyme activity. Decreases in hydrolysis were plotted as percent of original activity.

A free enzyme was prepared by 50 mg. in 100 ml. of buffer dissolved and the solution held at 88° C. Aliquots were removed and asayed by standard techniques and plotted as percent of original activity of the enzyme before being exposed to the high temperature.

Figure 2:
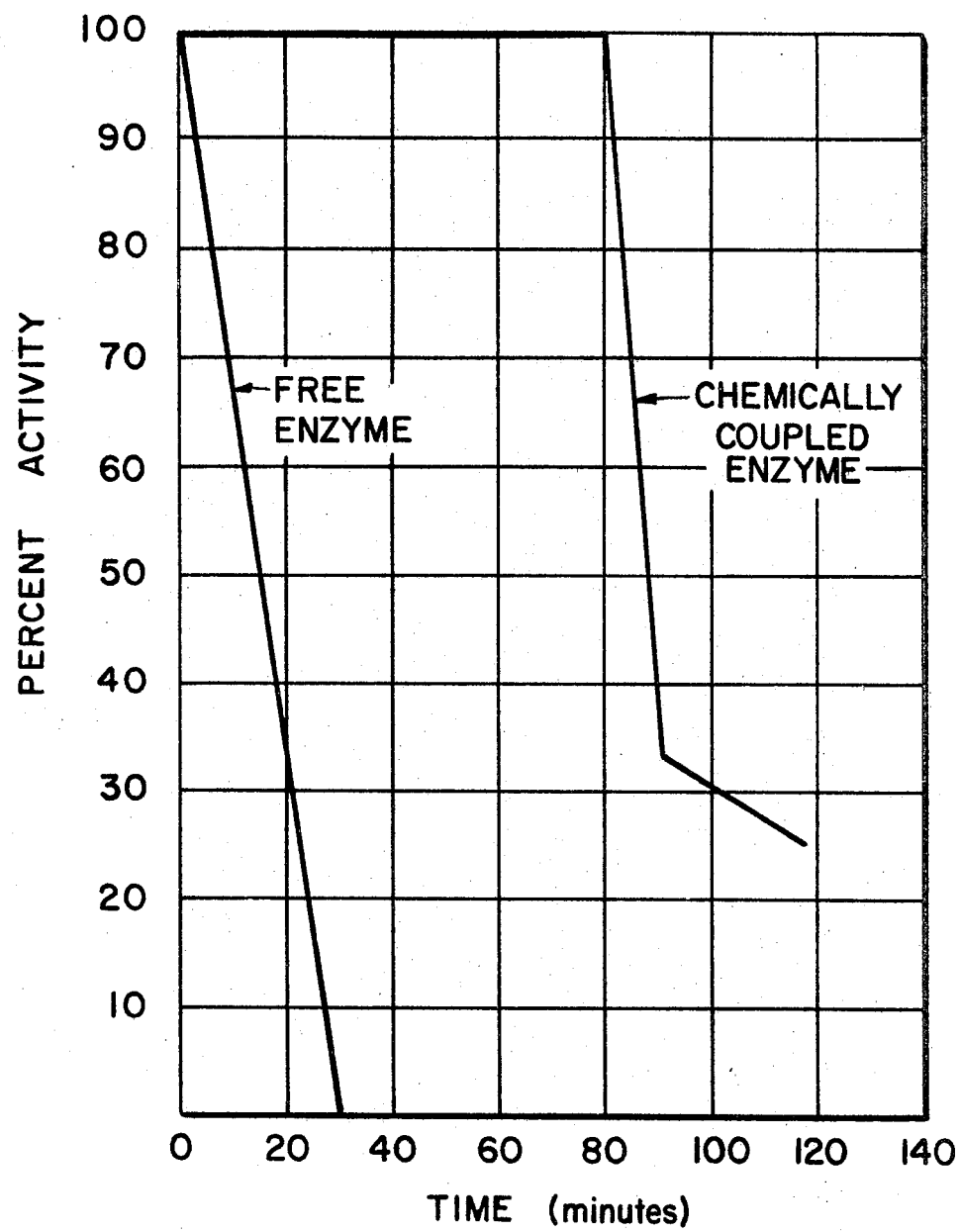

FIG. 2 graphically indicates the results obtained at high temperatures (88° C.) in terms of percent activity as a function of time for the Free Enzyme and the Chemically Coupled Enzyme. The free enzyme lost activity immediately and was completely inactive in 30 minutes. In comparison, the chemically coupled papain showed no decrease in enzymatic activity for 80 minutes. These results demonstrate the increased thermal stability of the chemically coupled papain over the free enzyme.

EXAMPLE V

Nickel screen 150 mesh, 0.1 mm. O.D. was cut into strips of 1" x 5" each. The strips were rolled into cylinders of approximately ½" I.D. and soldered to prevent unravelling. The screens were first placed in a furnace at 700° C. for two hours in an oxygen atmosphere to oxidize the surface thereby forming a NiO coating on the screens.

The NiO coated screens were refluxed overnight in a 10% solution of $\gamma$-aminopropyltriethoxysilane in toluene. The aminoalkylsilane derivative was washed in acetone and dried. The screens were refluxed overnight in 10% thiophosgene in chloroform. The isothiocyanoalkylsilane derivative was washed with chloroform and immediately coupled to glucose oxidase.

The derivative was added to a 1% solution of glucose oxidase in 0.1 M NaHCO$_3$, pH 9.0, and maintained at room temperature. The reactants were stirred for 2–3 hours, washed with distilled water, and the chemically coupled enzyme NiO coated screen product was stored at 5° C. in distilled water.

The enzyme activity of the product was determined in terms of $\mu$g. enzyme activity based on the activity of known quantities of soluble enzyme. The substrate employed for all experiments was anhydrous D-glucose (dextrose) in the concentration range of 0.00055 M to 0.055 M, disoslved in 0.01 M phosphate, pH 6.0.

The free enzyme sample was assayed by adding a 0.5 ml. aliquot containing 250 $\mu$g. of purified glucose oxidase to 50 ml. of substrate containing 100 $\mu$g./ml. of horseradish peroxidase and 0.0005% o-dianisidine. The reactants were stirred by a magnetic stirrer. Initially, a 2 ml. sample was taken as a control. At 1 minute intervals over a 5 minute period, 2.0 ml. samples were withdrawn and placed in tubes containing one drop 4 N HCl in 0.5 ml. distilled water. The solutions were read spectrophotometrically at 460 m$\mu$. The experiments were carried out at 23° C.

The chemically coupled enzyme-NiO coated screen was assayed by a procedure similar to that above except that equivalent quantities of peroxidase and o-dianisidine were added to each tube in 0.5 ml. volumes. This was done to prevent the adsorption of the o-dianisidine to the NiO screen. Each tube was allowed to develop for 1–3 minutes before addition of 4 N HCl.

(A) Time stability experiment

Samples of the chemically coupled enzyme were stored at 4° C. and assayed over a six month period. Results are shown in the table below.

| Assay | μg. Enzyme activity | Percent of initial activity |
|---|---|---|
| Initial | 375 | |
| After 7 days | 375 | 100 |
| After 14 days | 300 | 80 |
| After 21 days | 225 | 60 |
| After 28 days | 225 | 60 |
| After 128 days | 225 | 53 |

These results clearly indicated that the coupled enzyme has long term stability.

(B) Thermal stability experiment

Figure 3:
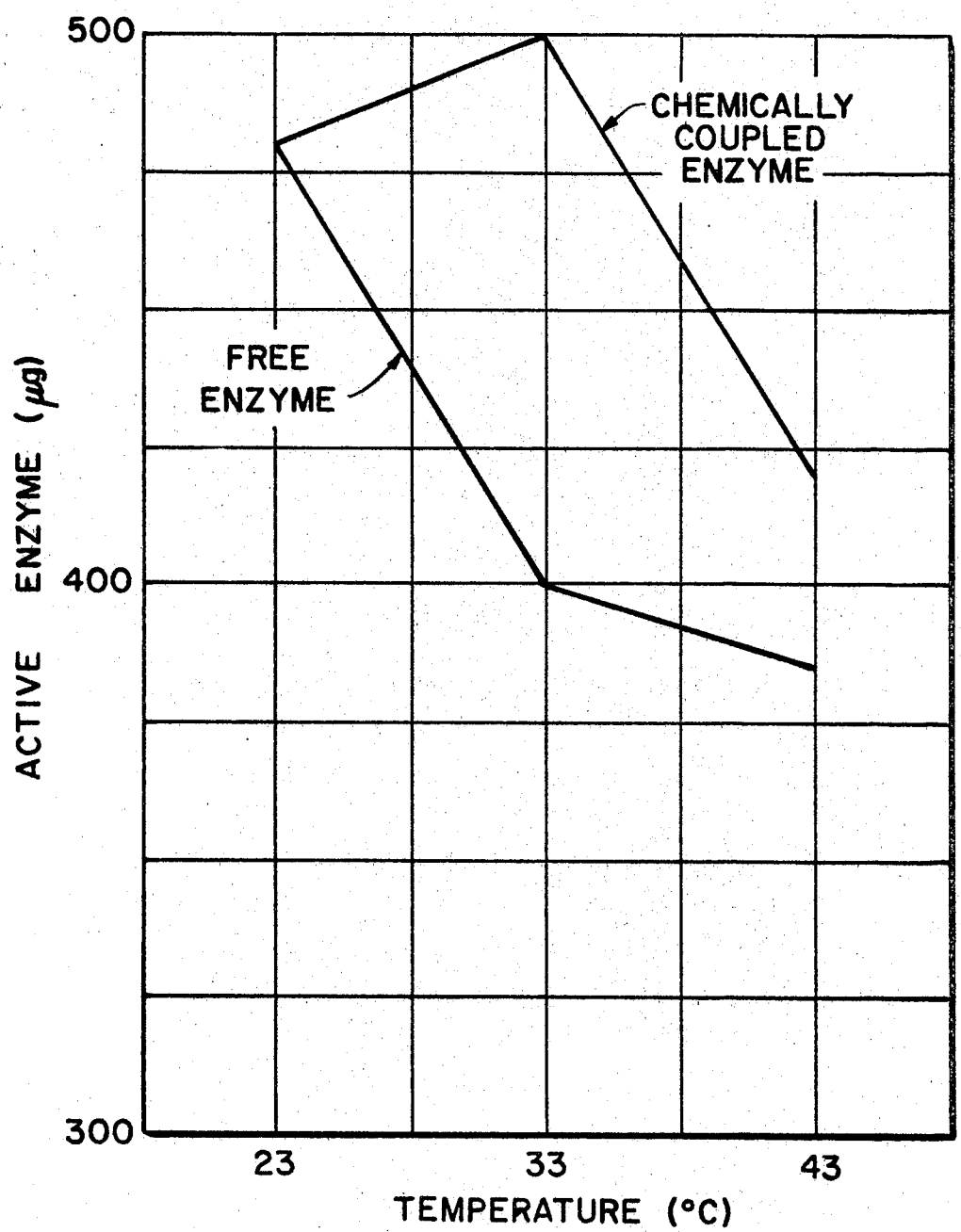

FIG. 3 shows the thermal stability of the chemically coupled glucose oxidase as compared to the free enzyme. The bound enzyme was added to 50 ml. of substrate at the desired temperature and assayed. At the end of the assay, the same sample was assayed at the next desired temperature. By employing this method, the time of exposure to higher temperatures is cumulative. Therefore, the actual difference in activity (based on μg. of active enzyme bound) between free enzyme and bound enzyme may be greater. These results should be consided minimum values.

An increased thermal stability has been achieved for the chemically coupled enzyme. At 33° C. the activity of the bound enzyme has increased while that of the free enzyme decreased. The free enzyme was assayed as described above using 480 μg. of glucose oxidase to approximate the activity of the chemically coupled enzyme. The dissolved enzyme at 23° C. was added to the warmed buffer solution at each of the indicated temperatures. Activity decreased immediately on exposure to increasing temperatures.

These results demonstrate the increased thermal stability of the chemically coupled glucose oxidase over the free enzyme.

EXAMPLES VI–XVIII

Following substantially the procedures of Examples II and III, various enzymes were chemically coupled to a series of representative inorganic carriers. In the table below the starting materials, namely the enzyme, the carrier, and the coupling agent used are indicated in columns 2, 3, and 4. The coupling agents are given in terms of letters wherein B is the diazoarylsilane derivative (as discussed in Example II) and C is the isothiocyanoalkylsilane derivative (as discussed in Example III). The activities of the chemically coupled enzymes are shown in column 6 using the substrate of column 5.

We claim:

1. An insolubilized enzyme comprising an enzyme coupled covalently to an inorganic carrier having available hydroxyl or oxide groups, said enzyme being coupled to the carrier by means of an intermediate silane coupling agent wherein the silicon portion of the coupling agent is attached to the carrier and the organic portion of the coupling agent is attached to the enzyme.

2. The enzyme composite of claim 1 wherein the silane coupling agent is combined with enzyme as represented by the formula:

Enzyme-Z-silane coupling agent wherein Z is a member selected from the group consisting of

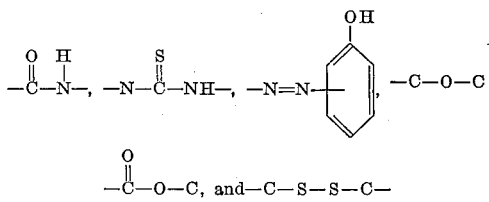

3. The insolubilized enzyme of claim 1, wherein said silane coupling agent has the general formula:

$$Y_nSiR_{4-n}$$

wherein Y is a member selected from the group consisting of amino, carbonyl, carboxy, hydroxyphenyl, and sulfhydryl; R is a member selected from the group consisting of lower alkoxy, phenoxy, and halo; and $n$ is an integer, having a value of 1–3.

4. The insolubilized enzyme of claim 1, wherein said silane coupling agent has the general formula of:

$$(Y'R')_nSiR_{4-n}$$

wherein Y' is a member selected from the group consisting of amino, carbonyl, carboxy, isocyano, diazo, isothiocyano, nitroso, sulfhydryl, halocarbonyl; R is a member selected from the group consisting of lower alkoxy, phenoxy, and halo; R' is a member selected from the group consisting of lower alkyl, lower alkylphenyl, and phenyl; and $n$ is an integer having a value of 1–3.

5. The insolubilized enzyme of claim 4, wherein R is lower alkoxy and R' is lower alkyl.

6. The insolubilized enzyme of claim 5 wherein the carrier is a siliceous material.

7. The insolubilized enzyme of claim 6 wherein said siliceous material is amorphous and contains at least 50 mole percent silica.

8. The insolubilized enzyme of claim 7, wherein the carrier is porous glass.

9. The insolubilized enzyme of claim 7, wherein the carrier is colloidal silica.

| Example | Coupled enzyme | Inorganic carrier | Coupling agent | Substrate | Sample activities, mg./g. |
|---|---|---|---|---|---|
| VI | Papain | Porous glass | C | Casein | 1.5 |
| VII | Alkaline protease | Colloidal silica | C | do | 92.0 |
| VIII | Ficin | Porous glass | B | do | 0.9 |
| IX | do | do | C | do | 2.7 |
| X | Urease | do | B | Urea | 1.0 |
| XI | Alkaline phosphatase | do | B | p-Nitrophenylphosphate | 0.7 |
| XII | Glucose oxidase | do | B | Dextrose | 10.1 |
| XIII | do | do | C | do | 11.8 |
| XIV | do | Colloidal silica | C | do | 24.0 |
| XV | do | Alumina | C | do | 6.0 |
| XVI | do | Hydroxy apatite | C | do | 10.7 |
| XVII | Peroxidase | Porous glass | B | Hydrogen peroxide | 1.0 |
| XVII | do | Nickel oxide | C | do | 0.5 |

It will be apparent to those skilled in the art that many variations and modifications of the invention as hereinabove set forth may be made without departing from the spirit and scope of the invention. The invention is not limited to those details and applications described, except as set forth in the appended claims.

10. The insolubilized enzyme of claim 6, wherein said siliceous material is crystalline.

11. The insolubilized enzyme of claim 10, wherein the carrier is bentonite.

12. The insolubilized enzyme of claim 10, wherein the carrier is wollastonite.

13. The insolubilized enzyme of claim 5, wherein said carrier is a non-siliceous metal oxide.

14. The insolubilized enzyme of claim 13, wherein the carrier is a transition metal oxide.

15. The insolubilized enzyme of claim 14, wherein the carrier is nickel oxide.

16. The insolubilized enzyme of claim 13, wherein said metal oxide is a weak acid.

17. The insolubilized enzyme of claim 16, wherein the carrier is alumina.

18. The insolubilized enzyme of claim 13 wherein said metal oxide is a weak base.

19. The insolubilized enzyme of claim 18, wherein the carrier is hydroxy apatite.

20. The insolubilized enzyme of claim 5, wherein said enzyme is a hydrolytic enzyme.

21. The insolubilized enzyme of claim 20, wherein said enzyme is urease.

22. The insolubilized enzyme of claim 20, wherein said enzyme is asparaginase.

23. The insolubilized enzyme of claim 20, wherein said enzyme is alkaline phosphatase.

24. The insolubilized enzyme of claim 20, wherein said enzyme is a protease.

25. The insolubilized enzyme of claim 24, wherein said protease is trypsin.

26. The insolubilized enzyme of claim 24, wherein said protease is papain.

27. The insolubilized enzyme of claim 24, wherein said protease is ficin.

28. The insolubilized enzyme of claim 24, wherein said protease is *Bacillus subtilis* alkaline protease.

29. The insolubilized enzyme of claim 5, wherein said enzyme is a redox enzyme.

30. The insolubilized enzyme of claim 29, wherein said redox enzyme is glucose oxidase.

31. The insolubilized enzyme of claim 29, wherein said redox enzyme is peroxidase.

32. The insolubilized enzyme of claim 5, wherein said enzyme is a transferase.

33. A method of making an insolubilized enzyme composite comprising the steps of:
 (a) bonding to an inorganic carrier, having available hydroxyl or oxide groups, a silane coupling agent having a silicon portion and an organic portion to form a coupling agent-carrier combination, and
 (b) bonding said combination to the enzyme by means of the organic portion of the coupling agent.

34. The method of claim 33, wherein said coupling agent has the general formula of:

$$(Y'R')_n SiR_{4-n}$$

wherein Y' is a member selected from the group consisting of amino, carbonyl, carboxy, isocyano, diazo, isothiocyano, nitroso, sulfhydryl, halocarbonyl; R is a member selected from the group consisting of lower alkoxy, phenoxy, and halo; R' is a member selected from the group consisting of lower alkyl, lower alkylphenyl, and phenyl, and $n$ is an integer having a value of 1–3.

35. The method of claim 34, wherein R is lower alkoxy and R' is lower alkyl.

References Cited

Bernfeld et al., Science 142, 678–672 (1963).

LIONEL M. SHAPIRO, Primary Examiner

U.S. Cl. X.R.

195—68, 103.5